United States Patent [19]

Collins

[11] 4,229,900
[45] Oct. 28, 1980

[54] FISHING APPARATUS

[76] Inventor: James R. Collins, 1528 S. Post Oak, Houston, Tex. 77056

[21] Appl. No.: 934,320

[22] Filed: Aug. 16, 1978

[51] Int. Cl.³ .................................. A01K 91/00
[52] U.S. Cl. .............................. 43/43.11; 242/84.2 J; 242/85.1; 242/96
[58] Field of Search ................... 43/43.11; 242/84.2 J, 242/85.1, 96

[56] References Cited

U.S. PATENT DOCUMENTS

| 1,408,261 | 2/1922 | Brookhart | 242/85.1 |
| 1,634,436 | 7/1927 | Polson | 43/43.11 |
| 1,950,745 | 3/1934 | Patterson | 242/96 |
| 2,745,608 | 5/1956 | Walker | 242/85.1 |
| 2,866,436 | 12/1958 | Swain et al. | 242/96 |
| 3,010,673 | 11/1961 | Marconi | 43/43.11 |
| 3,050,895 | 8/1962 | Bratland et al. | 43/43.11 |
| 3,169,723 | 2/1965 | Wilson | 242/96 |
| 3,174,703 | 3/1965 | Falkum | 242/84.2 J |
| 3,289,968 | 12/1966 | Wilson | 242/96 |
| 3,352,050 | 11/1967 | Mowrey | 43/43.11 |
| 3,500,575 | 3/1970 | Klemkowski | 43/43.11 |
| 3,771,487 | 11/1973 | McGee | 242/85.1 |

FOREIGN PATENT DOCUMENTS

| 248311 | 12/1963 | Australia | 242/85.1 |
| 687132 | 5/1964 | Canada | 43/43.11 |
| 715266 | 8/1965 | Canada | 43/43.11 |
| 839209 | 6/1960 | United Kingdom | 242/96 |

Primary Examiner—Othell M. Simpson
Assistant Examiner—J. T. Zatarga
Attorney, Agent, or Firm—Carl B. Fox, Jr.

[57] ABSTRACT

Fishing apparatus, including a relatively short tubular cylinder around which fishing line is wound, the cylinder having a diametric crossbar adapted to be held by one of the hands of the user. The cylinder may have a raised rib or flange around each of its ends to assist in retaining the line thereon. At one side of the cylinder, an inwardly flared recess is provided adjacent the end of the crossbar, whereby the crossbar may be grasped by the fingers of one hand while the thumb of that hand is disposed in the flared recess in a position to be useful in controlling the line. Mirror image flared recesses may be provided, one at each end of the crossbar, in positions whereby one may be used when the drum is held in one hand and the other may be used when the drum is held in the opposite hand. The apparatus is, therefore, adapted for use by either righthanded or lefthanded persons. Casting of the line is accomplished by swinging the free end of the line in a circle and then releasing it at a rapid velocity. Withdrawal of line from the cylinder during casting and drag on the line may be controlled by adjusting the angle of the cylinder to the cast direction. In one embodiment, a transverse bar is provided which permits rotation of the cylinder and provides additional means for controlling drag on the line. The free hand is used in rewinding of the line about the cylinder, by drawing in lengths of line and manipulating the cylinder and line to accomplish the rewinding.

2 Claims, 8 Drawing Figures

U.S. Patent  Oct. 28, 1980  Sheet 1 of 2  4,229,900
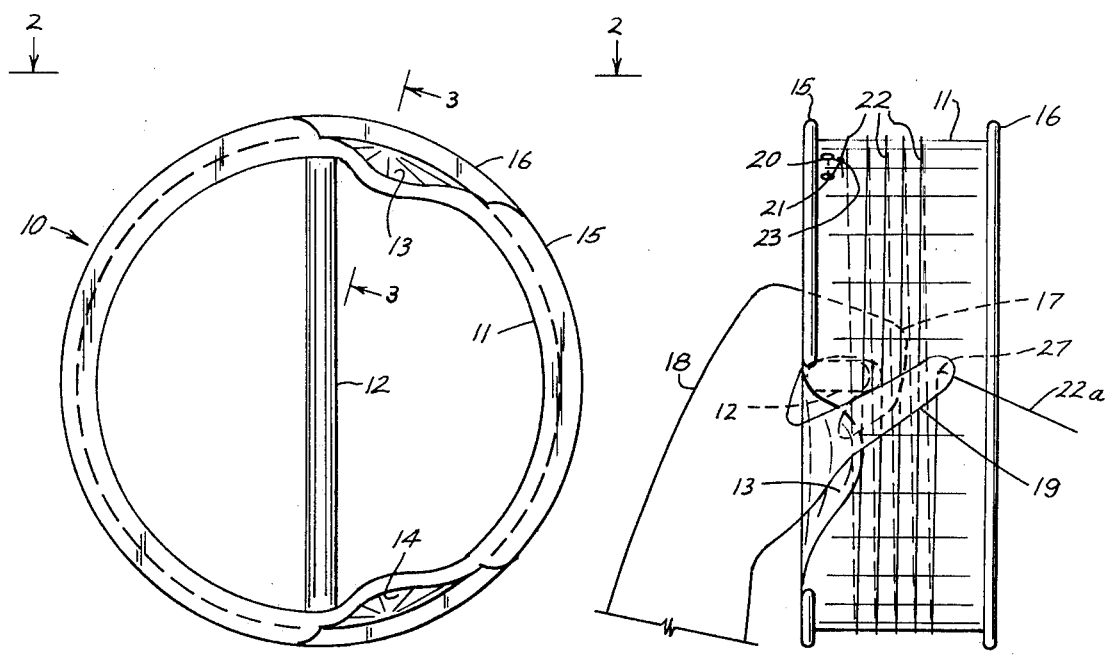
Fig. 1
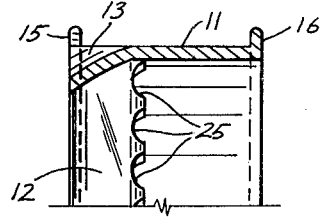
Fig. 2
Fig. 3
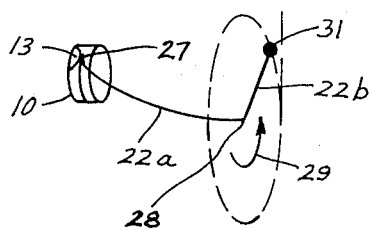
Fig. 4
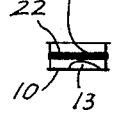
Fig. 5
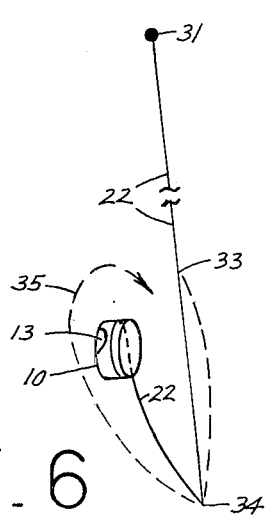
Fig. 6

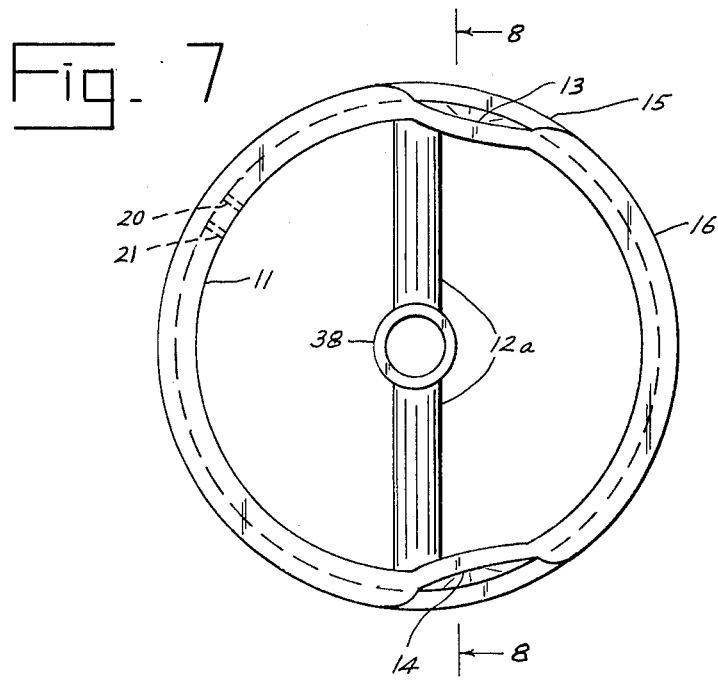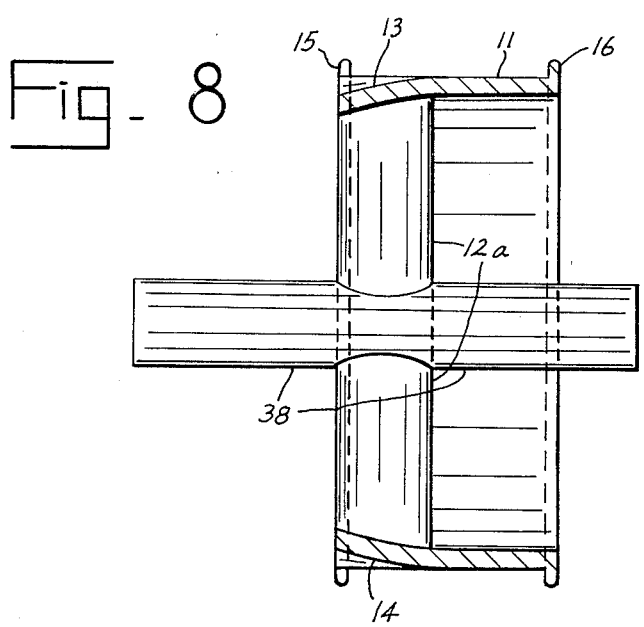

FISHING APPARATUS

SUMMARY OF THE INVENTION

Fishing apparatus, including a tubular cylinder around which fishing line is wound, the cylinder being held by one hand by grasping a crossbar of the cylinder with the fingers with the thumb overlaid at the exterior of the cylinder for use in controlling the line. The cylinder may have end ribs or flanges to assist in retaining line thereon. Flared recesses are provided at opposite ends of the crossbar in mirror image relation to receive the thumb of either hand in a comfortable position, so that the apparatus is useful for both lefthanded and righthanded persons. Casting of the line is accomplished by swinging the free end of the line in circular movement with the other hand, and releasing the line at high velocity in the direction of the cast to cause withdrawal of additional line from the cylinder. The angle of the cylinder with regard to the direction of the cast is altered to permit, control, or terminate the withdrawal of line. Rewinding of line on the drum or cylinder is accomplished by drawing in lengths of line with the free hand and manipulating the line and cylinder to accomplish the rewinding.

A principal object of the invention is to provide hand held fishing apparatus consisting of a cylinder around which fishing line is wound for storage and from which fishing line may be cast by swinging a weighted end of the line in circular motion and releasing the line in the direction of the cast and with the cylinder being simultaneously moved to a position wherein the line may be withdrawn therefrom. Another object of the invention is to provide such apparatus wherein the drum or cylinder has raised ribs or flanges around its opposite ends to assist in retaining line thereon. A further object of the invention is to provide such fishing apparatus which is adapted for use by either a lefthanded or righthanded person and which may be held by either hand of the user. A still further object of the invention is to provide such apparatus which is simple and economical, yet which is dependable in use.

BRIEF DESCRIPTION OF THE DRAWINGS

FIG. 1 is a side elevation showing an apparatus of preferred form according to the invention.

FIG. 2 is a top elevation of the apparatus shown in FIG. 1, taken at line 2—2 of FIG. 1.

FIG. 3 is a partial annular cross section taken at line 3—3 of FIG. 1.

FIGS. 4-6 are schematic drawings illustrating the manner of use of the apparatus.

FIG. 7 is a side elevation of a modified form of apparatus according to the invention.

FIG. 8 is a vertical cross section taken at line 8—8 of FIG. 7.

DESCRIPTIONS OF THE PREFERRED EMBODIMENTS

Referring now to the drawings in detail, and first to FIGS. 1-3, fishing apparatus 10 of preferred form according to the invention includes a tubular cylinder 11 having a crossbar 12 depending diametrically thereacross at or near one end. The cylinder 11 has an inwardly flared depressed wall portion 13 at one side thereof and has another inwardly flared depressed wall portion 14 at its opposite side in mirror image form. Formations 13 and 14 are at the same side of crossbar 12, one being adapted for use when the apparatus is held by the left hand and the other being adapted for use when the apparatus is held by the right hand.

Normally, the formation 13 will be used when the apparatus is held in the left hand, while the formation 14 will be utilized when the apparatus is held in the right hand. The apparatus may be held by either hand of either a right handed or a left handed person. Raised ribs or flanges 15, 16 are preferably provided around the opposite ends of the cylinder 11 as is best shown in FIG. 2. The apparatus is shown in FIG. 2 held by the left hand of a person, the fingers 17 of hand 18 being disposed about crossbar 12 while the thumb is laid over formation 13, as shown.

Cylinder 11 has a pair of holes 20, 21 radially therethrough at one side through which the fishing line 22 may be passed and tied at 23. Still referring particularly to FIG. 2 of the drawings, fishing line 22 is passed over the cylinder 11 from holes 20, 21 and down the back side of the cylinder, then up around the front side of the cylinder, and so until the entire length of line is wound upon the cylinder. The terminal end of the line will, as customary for fishing, have affixed thereto any suitable combination of weights, leaders, hooks, lures, or the like. As will have been noted, the line on the cylinder may be readily retained by the thumb 19, especially at the terminal end portion thereof, to retain the line on the cylinder as well as for manipulation of the line during casting and retrieving of the line, as will be further described.

As is best shown in FIG. 3 of the drawings, the crossbar 12 is preferably provided along its inner side with a plurality of grooves or flutes 25 adapted to receive the fingers of the hand. The grooves or flutes 25 may be provided or omitted, as desired, but when provided assist in firm holding of the apparatus, since they prevent slipping of the fingers along the crossbar 12. The crossbar 12 is rounded at its corners for comfort in holding.

The cylinder 11 may be provided without the end flanges or ribs 15, 16, and used in the same manner as when the ribs or flanges are provided. The ribs or flanges assist somewhat in retaining of the line on the cylinder, but the apparatus may be satisfactorily used without provision of the ribs or flanges.

Referring now to FIGS. 4-6 of the drawings, the apparatus 10 structured as has been described is shown in a position as it would be held in the left hand of a person. The line 22 extends around the cylinder to a point 27 where it is held by the thumb (see also FIG. 2). Portion 22a of the line extends from point 27 to point 28 where it is held by the right hand, usually between the thumb and forefinger. The last terminal part of the line 22b is swung in circular motion in one direction or the other by suitable right hand movements, preferably in counterclockwise direction as viewed from the right hand side of FIG. 4, as indicated by arrow 29. The equipment at the end of the line is indicated by a ball 31, and may include, as described above, any combination of weights, leaders, hooks, lures, or the like. When the portion 22b of the line has reached sufficient circular velocity, the user throws the line forward with the right hand in a casting direction as indicated by dashed line 32. The thumb 19 releases the line from the cylinder and the cylinder 11 is simultaneously turned to a direction with its axis in the direction of the cast as indicated in FIG. 5. The line velocity withdraws line from the cylinder until the force has dissipated or until the cast is terminated by rotation of the cylinder to the original position with its axis transverse to the direction of the case.

When it is desired to reel in the line, the apparatus, still held by the left hand in the manner which has been described, is positioned as in FIG. 6 with regard to the direction of cast and the line is drawn in by the right hand grasping the line at a position 33 and drawing the line back to a position 34, to draw in the line, and then by moving the line one or more revolutions about the apparatus as indicated by arrowed dashed line 35. This procedure is repeated until the desired amount of line has been rewound upon cylinder 11. Cylinder 11 may be moved by the left hand to assist in the rewinding.

The line does not have to be wound on the cylinder in the orderly manner indicated in FIG. 2. The line is wound randomly on the outer surface of the cylinder, crossing and recrossing itself any number of times so that the line is in multiple random layers on the cylinder when wound thereon. Such random laying of the line on the cylinder does not inhibit casting of the line therefrom.

Surprisingly, the line may be cast in the manner described to a distance equal to or even greater than the distance which may be obtained through use of the customary casting rod and reel apparatus. Since the cylinder is of larger diameter than the diameters of normal casting reels, usually between about six inches and as much as eighteen or twenty inches in diameter, or even larger, the line may be readily reeled in at a faster rate than can be accomplished with the customary rod and reel. It will have been realized that faster reeling in may be accomplished with larger size of the cylinder since fewer revolutions of the line therearound are required for winding of the line on the cylinder. It should also be realized that winding of the line around the cylinder may be assisted by appropriate manipulation of the cylinder position during winding in order that the cylinder will be positioned at the proper place at all times with respect to the right hand which is winding the line thereon.

Referring now to FIGS. 7 and 8 of the drawings, there is shown a modified form of apparatus according to the invention. The apparatus is similar to that heretofore described, and like parts and elements thereof will be indicated by the same reference numerals as were heretofore employed. In the FIGS. 7-8 embodiment of the apparatus, crossbar 12a, which replaces crossbar 12 of FIGS. 1-3, has a bar 38 affixed perpendicular thereto. The bar 38 will normally be at the ceneter of the length of crossbar 12a, as shown. The bars 12a, 38 may be either solid or tubular, as desired, tubular formation thereof making the apparatus somewhat lighter in weight. The bar 12a does not have the flutes or grooves 25 shown in the FIG. 1-3 apparatus, but is held by either hand in the same manner as the FIG. 1-3 apparatus. During the casting of the line from the apparatus of FIG. 7-8, the bar 12a may be held by either hand with the thumb in one or the other of formations 13, 14. The thumb will be against formation 13 when the apparatus is held by the left hand, and will be against formation 14 when the apparatus is held by the right hand. This manner of casting is the same as has already been described for the FIG. 1-3 embodiment of apparatus. An alternative manner of casting may be employed with the apparatus of FIGS. 7-8, with one hand holding one end of bar 38 while the other hand circularly swings the line end and releases the line in the casting direction. The position of apparatus 10 is changed during casting as before, to permit, control or stop line withdrawal. The hands may be placed on the opposite ends of bar 38, loosely to permit line withdrawal, tighter to impede line withdrawal, and very tight to stop cylinder rotation and thereby stop line withdrawal.

After the cast has been completed, the apparatus may be held by bar 38 by one or both hands, drag on the line being varied by firm or loose holding of bar 38 by the hand or hands. In case greater force on the line is required, the apparatus may be held by one hand on bar 12a as already described, this causing complete braking against withdrawal of the line from the cylinder. However, withdrawal of line from the cylinder may be permitted even when bar 12 or 12a of either embodiment is held by hand by movement of the cylinder to a direction with its axis at least somewhat along the line direction permitting line to be withdrawn from the side of the cylinder. Rewinding of line onto the cylinder is accomplished in use of the FIG. 7-8 apparatus in the same manner as has already been described, with the apparatus held by either bar 12a or by bar 38.

A very high degree of control of the line may be effected with either form of the apparatus. Good directional control of casting is readily achieved. The position of the cylinder with respect to the line direction results in greater or lesser drag on the line, as compared with the drag usually accomplished with conventional equipment by what is known as a star drag, and in the FIG. 7-8 embodiment an additional drag control is realized through grasping of bar 38 and either permitting or not permitting rotation of the cylinder while held by bar 38. As has already been mentioned, the line may be allowed to be cast at a rapid rate or at a less rapid rate through control of the angular position of the cylinder with respect to the line direction. As has also been earlier mentioned, rewinding of the line onto the cylinder may be accomplished very rapidly by use of the free hand reaching forward and grasping the line and drawing the line backward to be wound onto the cylinder.

The apparatus is much more compact than conventional fishing apparatus, and may easily be stored in a very small space and may be readily transported either with or without a container. When the apparatus is not in use, the end of the fishing line may be wound about or tied to the crossbar 12 or 12a, or in the case of the FIG. 7-8 embodiment, around the bar 38. When thus fixed, the line will not accidentally be enabled to fall from the cylinder to become entangled.

Because of the high degree of control achieved during casting and rewinding of the line and during periods when the line is allowed to remain in the water in the hope of a "bite", a user will find great satisfaction in the use of the apparatus. The apparatus is normally held at a position considerably below the level of the shoulders, and the arms of the user directly provide the longitudinal flexibility in the line which is usually accomplished by flexing of a fishing rod or pole.

The apparatus in either form may be molded as a unitary structure, preferably of a suitable plastic material such as polyvinyl chloride or other suitable plastic, or may be fabricated of metal, wood, or plastic parts. The plastic or other structural material may be colored for improved appearance and/or visibility.

While preferred embodiments of the apparatus have been described and shown in the drawings, many modifications thereof may be made by a person skilled in the art without departing from the spirit of the invention, and it is intended to protect by Letters Patent all forms of the invention falling within the scope of the following claims.

I claim:

1. Fishing apparatus, comprising a tubular cylinder around which any selected length of fishing line may be randomly wound, and a crossbar interiorly across said cylinder fixedly connected between opposite sides of said cylinder adapted to be held by hand to support said cylinder, said crossbar being disposed adjacent an end of said cylinder whereby said crossbar may be grasped by the fingers of one hand while the thumb of the same hand is disposed at the exterior of the cylinder to be used to control fishing line wound therearound, said cylinder having a smoothly depressed outer surface portion inwardly flared toward the cylinder end adjacent which said crossbar is disposed and at one side of an end of said crossbar against which the thumb may be comfortably positioned while the fingers are disposed about said crossbar inward of said cylinder, said apparatus including a bar affixed to said crossbar and disposed transversely of said crossbar along the axis of said cylinder and extending to opposite sides of said crossbar adapted for holding loosely by hand to permit rotation of said cylinder therearound and adapted for holding more firmly by hand to produce drag in the fishing line and adapted to be fixedly held by hand to prevent rotation of said cylinder therearound.

2. Fishing apparatus, comprising a tubular cylinder around which any selected length of fishing line may be randomly wound, and a crossbar interiorly across said cylinder fixedly connected between opposite sides of said cylinder adapted to be held by hand to support said cylinder, said crossbar being disposed adjacent an end of said cylinder whereby said crossbar may be grasped by the fingers of one hand while the thumb of the same hand is disposed at the exterior of the cylinder to be used to control fishing line would therearound, said cylinder having a smoothly depressed outer surface portion inwardly flared toward the cylinder end adjacent which said crossbar is disposed and at one side of an end of said crossbar against which the thumb may be comfortably positioned while the fingers are disposed about said crossbar inward of said cylinder, said cylinder including a second smoothly depressed outer surface portion inwardly flared toward the cylinder end adjacent which said crossbar is disposed and at said one side of an end of said crossbar adapted for holding in the described manner with the opposite hand, said apparatus including a bar affixed to said crossbar and disposed transversely of said crossbar along the axis of said cylinder and extending to opposite sides of said crossbar adapted for holding loosely by hand to permit rotation of said cylinder therearound and adapted for holding more firmly by hand to produce drag in the fishing line and adapted to be fixedly held by hand to prevent rotation of said cylinder therearound.

* * * * *